(12) United States Patent
Krishnan et al.

(10) Patent No.: US 8,612,702 B1
(45) Date of Patent: Dec. 17, 2013

(54) SYSTEMS AND METHODS FOR PERFORMING OPTIMIZED BACKUPS OF MULTIPLE VOLUMES

(75) Inventors: Sasidharan Krishnan, Sunnyvale, CA (US); Suhas Urkude, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 364 days.

(21) Appl. No.: 12/414,782

(22) Filed: Mar. 31, 2009

(51) Int. Cl.
*G06F 12/00* (2006.01)

(52) U.S. Cl.
USPC .......................................... 711/162; 707/646

(58) Field of Classification Search
None
See application file for complete search history.

(56) References Cited

U.S. PATENT DOCUMENTS

| | | | |
|---|---|---|---|
| 6,785,786 B1 * | 8/2004 | Gold et al. | 711/162 |
| 7,814,149 B1 * | 10/2010 | Stringham | 709/203 |
| 7,853,750 B2 * | 12/2010 | Stager | 711/112 |
| 7,900,002 B2 * | 3/2011 | Lyon | 711/161 |
| 2009/0164529 A1 * | 6/2009 | McCain | 707/204 |
| 2009/0204650 A1 * | 8/2009 | Wong et al. | 707/204 |

OTHER PUBLICATIONS

Fu et al., AA-Dedupe: An application-Aware Source Deduplication Approach for Cloud backup Services in the Personal computing Environment, 2011, IEEE International Conference on Cluster Computing.*

* cited by examiner

*Primary Examiner* — Reginald Bragdon
*Assistant Examiner* — Baboucarr Faal
(74) *Attorney, Agent, or Firm* — ALG Intellectual Property, LLC

(57) ABSTRACT

Computer-implemented methods, systems, and computer-readable media for performing optimized backups of multiple volumes are disclosed. In one example, an exemplary method for performing such a task may comprise: 1) identifying a plurality of volumes, 2) prior to backing up the plurality of volumes, obtaining information that indicates that at least one volume within the plurality of volumes comprises at least one shared region of memory that is identical to a region of memory on at least one other volume within the plurality of volumes, and 3) when creating backups of the plurality of volumes, backing up each shared region of memory a single time so that the backups of the plurality of volumes share a single copy of each shared region of memory.

20 Claims, 7 Drawing Sheets

SYSTEMS AND METHODS FOR PERFORMING OPTIMIZED BACKUPS OF MULTIPLE VOLUMES

BACKGROUND

Conventional volume-management technologies may be used to create and manage multiple virtual or physical machines from a source machine (which may, in some cases, also be a virtual machine). Some technologies may create these multiple machines from the source machine by taking snapshots (such as copy-on-write or space-optimized snapshots) of boot and data disks in the source machine and then using these snapshots to form the virtual or physical machines.

Over time, various patches, installations, and upgrades may modify regions of memory in the machines. Often, the same modifications may be made to multiple machines. For example, a network administrator may apply identical patches to multiple machines located on a network managed by the administrator. In an example where the multiple machines are initially cloned from the same source machine, the multiple machines may share a number of identical regions of data, even after these modifications. As changes are made to the various regions of memory, snapshot volumes corresponding to each of the machines may be individually created and stored. Additionally, individual backup copies of the machines may be periodically saved to a backup database.

Because, in this example, individual snapshot volumes and backup copies are made for each of the multiple machines, significant storage space must often be provided to accommodate the corresponding snapshot volumes and backup copies of the volumes. Additionally, backup servers must often have significant processing bandwidth, input/output bandwidth, and memory bandwidth to accommodate the transfer and processing of data related to snapshot volumes and backup copies of the multiple machines. Further, because identical modifications are often made to multiple machines in a network, the databases storing the snapshot volumes and backup copies may contain a significant amount of redundant data.

SUMMARY

As will be described in greater detail below, the instant disclosure generally relates to systems and methods for performing optimized backups of multiple volumes. In one example, an exemplary method for performing this task may comprise: 1) identifying a plurality of volumes (e.g., volumes used by one or more virtual and/or physical machines), 2) prior to backing up the volumes, obtaining information that indicates that at least one volume within the plurality of volumes comprises at least one shared region of memory that is identical to a region of memory on at least one other volume within the plurality of volumes (by, for example, querying one of the volumes for deduplication information from an existing deduplication subsystem), and then 3) when backing up the plurality of volumes, backing up each shared region of memory a single time so that the backups of the plurality of volumes share a single copy of each shared region of memory.

The systems disclosed herein may obtain and use information that indentifies regions of memory within multiple volumes that are identical (sometimes referred to herein as "deduplication information") from any type or form of deduplication subsystem. For example, the systems disclosed herein may obtain and use deduplication information from a deduplication subsystem that creates and stores deduplicated snapshots (e.g., copy-on-write snapshots such as space-optimized snapshots) of multiple machine volumes. In this example, the snapshots may be deduplicated and maintained by a deduplication engine (e.g., a cache object). The deduplication engine may also maintain deduplication information that identifies regions of memory (e.g., data blocks) in the multiple machine volumes that are shared (i.e., identical).

In this example, before each region of memory in the machine volumes is read for backup, a query requesting deduplication information may be performed on the machine volumes. The machine volumes may consult the deduplication engine to obtain deduplication information that identifies the shared or common regions of memory in the multiple machine volumes. This information may then be provided to the backup server. The backup server may then use this information to determine, for each region of memory, whether an identical region of memory has been previously backed up for any of the machine volumes. If an identical region of memory has been previously backed up, the backup server may update metadata information on the backup server to point to the identical region of memory. If, however, an identical region of memory has not been previously backed up, the backup server may back up the region of memory.

By obtaining information that identifies shared regions of memory within multiple volumes that are identical, the systems disclosed herein may, during a subsequent backup operation, use this information to only transfer a single copy of each shared region of memory to a backup server. Because the systems may not need to transfer multiple copies of identical regions of memory to a backup server, this may reduce the amount of bandwidth required to perform a backup operation in comparison with conventional backup systems. In addition, because the bandwidth and resources required to accomplish a backup operation may be reduced, the backup window required to accomplish the backup operation may also be reduced.

Additionally, because previously generated deduplication information may be used to back up data to a backup server, the systems disclosed herein may eliminate any need to replicate deduplication data in order to optimize backup data storage. Moreover, because a single copy of a region of memory may be shared among multiple backups on a backup server, the amount of storage space required on the backup server may be reduced in comparison with conventional backup systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
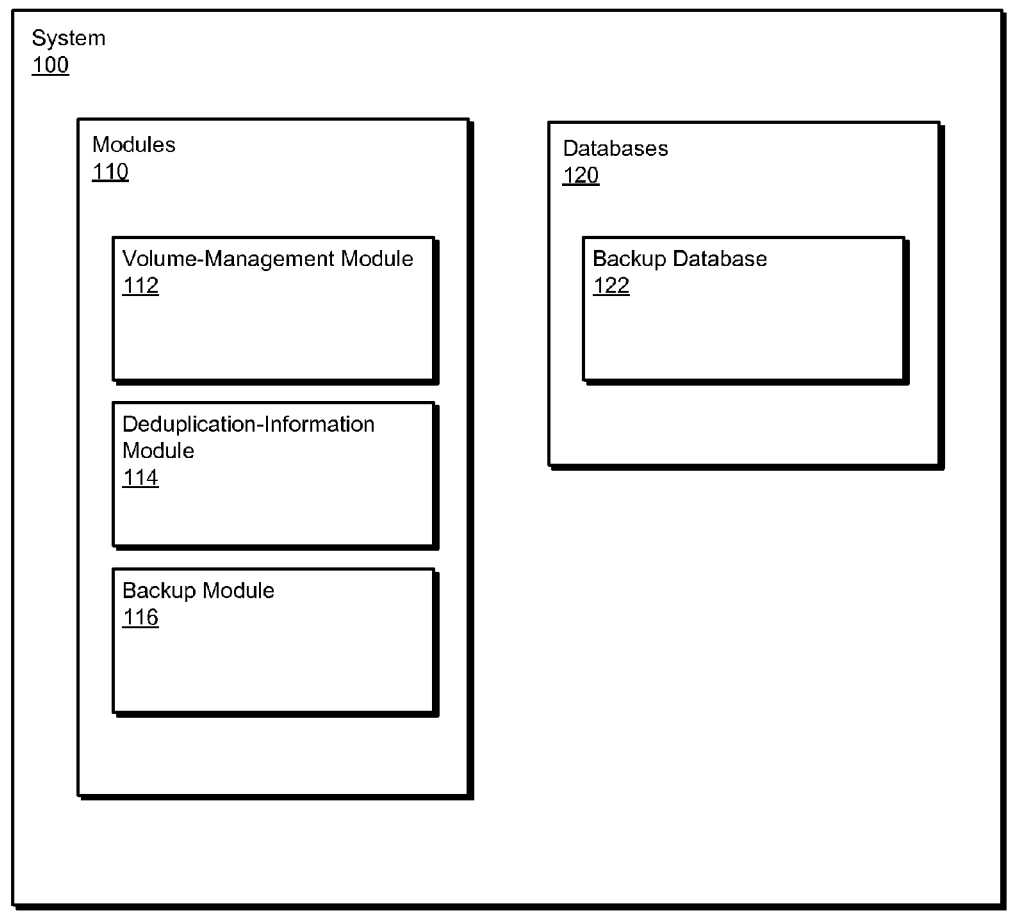
FIG. 1 is a block diagram of an exemplary system for performing optimized backups of multiple volumes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing optimized backups of multiple volumes. As used herein, the terms "deduplicate" and "deduplication" generally refer to storage systems that eliminate redundant data by storing a single instance of data. As will be described in greater detail below, this single instance of data may be referenced by a single file or a plurality of files in a deduplicated data system. Deduplication may also be known as single-instance storage or capacity optimization.

Figure 2:
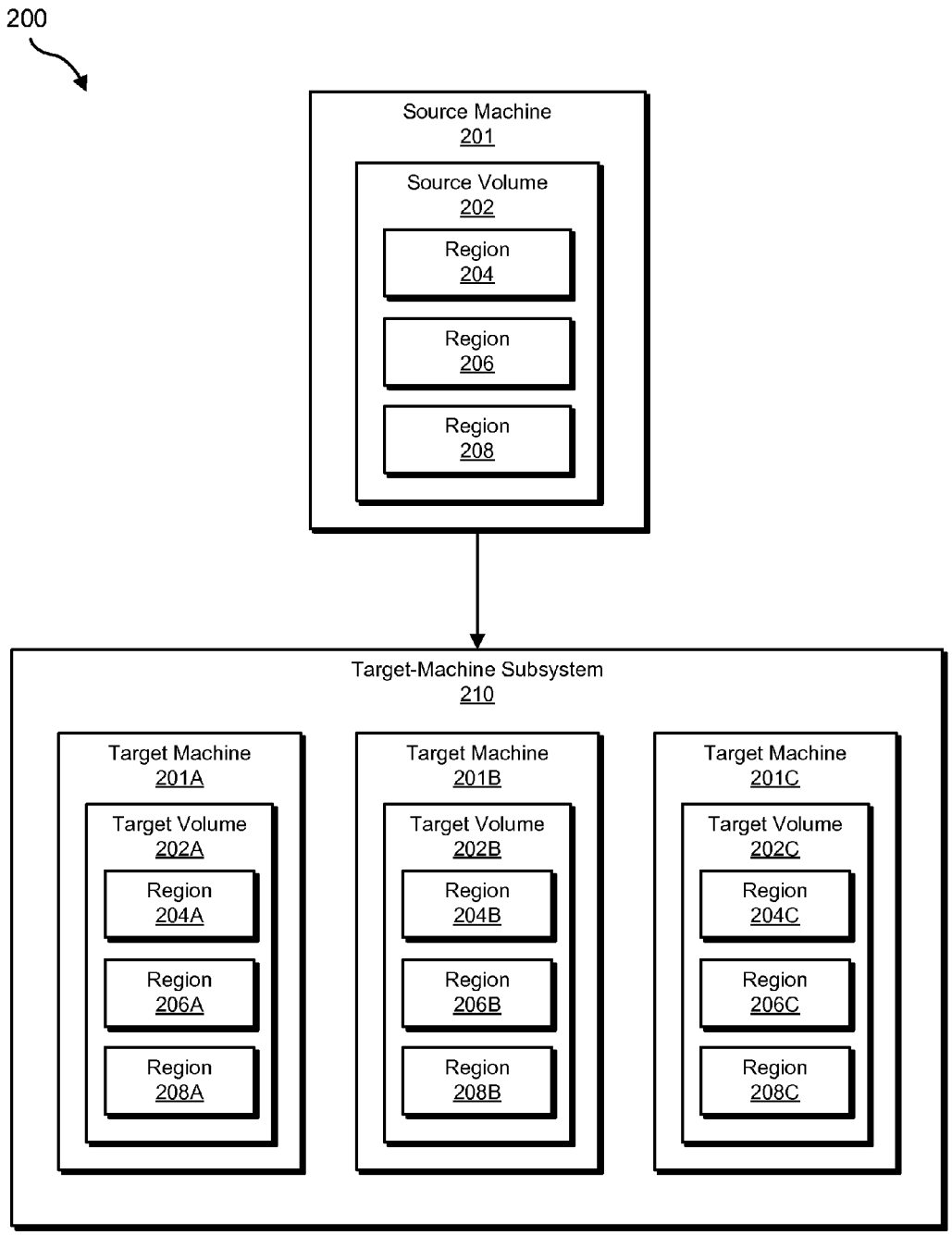
FIG. 2 is a block diagram of an exemplary system for creating target machines based on a source machine.
Figure 3:
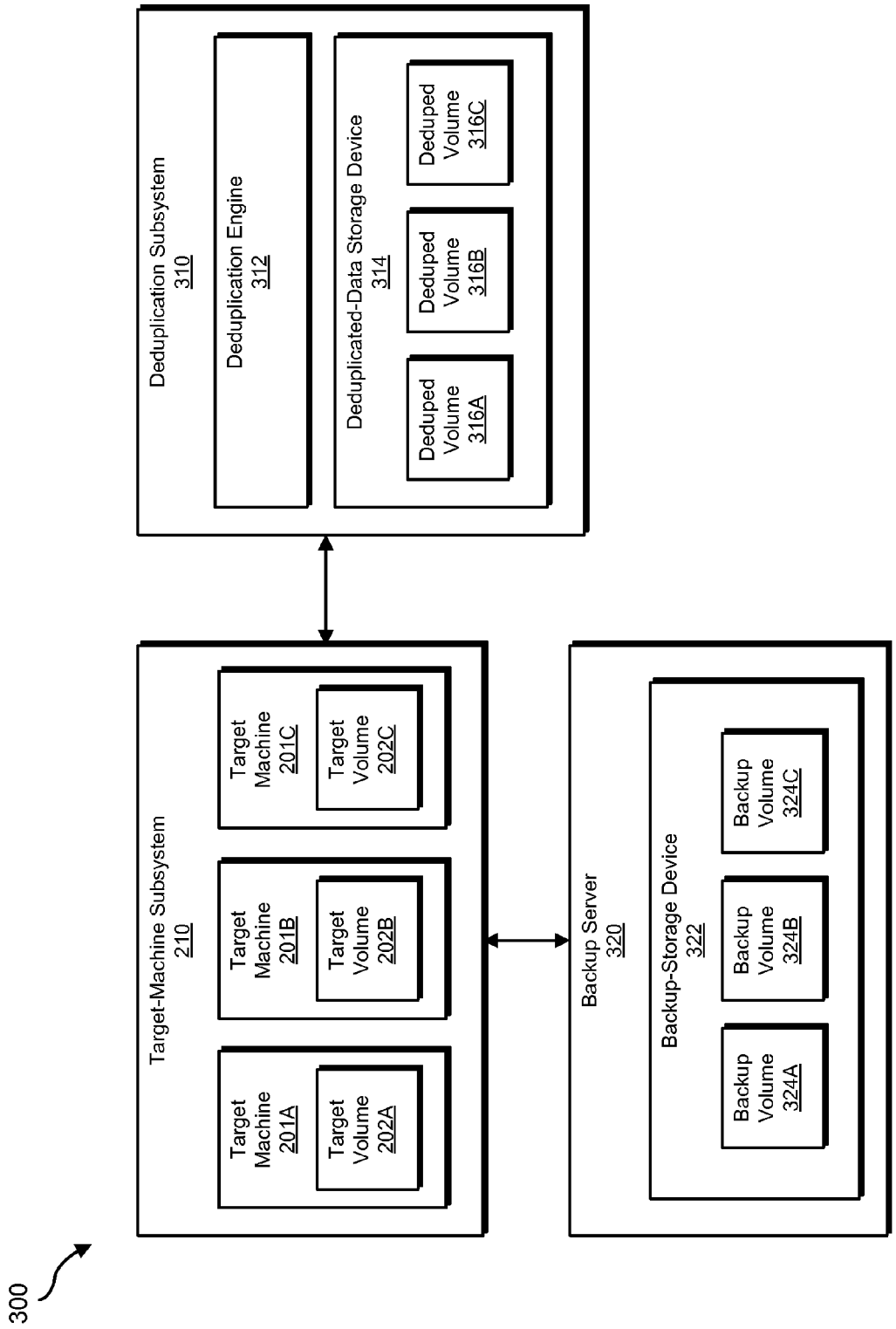
FIG. 3 is a block diagram of an exemplary system for performing optimized backups of multiple volumes.

The following will provide, with reference to FIGS. 1-3, detailed descriptions of exemplary systems for creating target machines based on a source machine and for performing optimized backups of multiple volumes on the target machines. Detailed descriptions of corresponding computer-implemented methods will be provided in connection with FIG. 4. In addition, a detailed description of an exemplary backup database comprising multiple volumes sharing various regions of memory will be provided in connection with FIG. 5. Further, detailed descriptions of an exemplary computing system and network architecture capable of implementing one or more of the embodiments described herein will be provided in connection with FIGS. 6 and 7, respectively.

FIG. 1 is a block diagram of an exemplary system 100 for performing optimized backups of multiple volumes. As illustrated in this figure, exemplary system 100 may comprise one or more modules 110 for performing one or more tasks. For example, and as will be explained in greater detail below, exemplary system 100 may comprise a volume-management module 112 programmed to identify one or more volumes, such as volumes used by physical or virtual machines.

Exemplary system 100 may also comprise a deduplication-information module 114 programmed to obtain deduplication information, such as deduplication information associated with one or more deduplicated volumes stored on a deduplication subsystem. Exemplary system 100 may also comprise a backup module 116 programmed to back up one or more volumes to a backup database. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the devices illustrated in FIGS. 2 and 3 (e.g., target-machine subsystem 210, deduplication subsystem 310, and/or backup server 320), computing system 610 in FIG. 6, and/or portions of exemplary network architecture 700 in FIG. 7. One or more of modules 110 in FIG. 1 may also represent all or portions of one or more special-purpose computers configured to perform one or more tasks.

In additional embodiments, exemplary system 100 may comprise databases 120 for storing data, such as data generated by one or more of modules 110. In some examples, databases 120 may comprise a backup database 122 for storing one or more backup volumes. For example, as will be explained in greater detail below, backup database 122 may comprise backup volumes corresponding to volumes used by one or more machines.

Databases 120 in FIG. 1 may represent portions of one or more computing devices, such as computing devices located on one or more subsystems and/or servers. For example, databases 120 may represent portions of target-machine subsystem 210 in FIGS. 2 and 3, deduplication subsystem 310 and backup-storage device 322 in FIG. 3, computing system 610 in FIG. 6, and/or portions of exemplary network architecture 700 in FIG. 7. Alternatively, databases 120 in FIG. 1 may represent one or more physically separate devices capable of being accessed by a computing device, such as target-machine subsystem 210 in FIGS. 2 and 3, deduplication subsystem 310 and backup-storage device 322 in FIG. 3, computing system 610 in FIG. 6, and/or portions of exemplary network architecture 700 in FIG. 7.

FIG. 2 is a block diagram of an exemplary system 200 for creating target machines based on a source machine. As illustrated in this figure, exemplary system 200 may comprise a source machine 201. In at least one example, source machine 201 may comprise a virtual or physical machine used as a template to clone additional virtual or physical machines (e.g., target machines 201A, 201B, and 201C in FIG. 2). Source machine 201 may comprise at least one source volume 202, which may in turn comprise one or more regions, such as regions 204, 206, and 208, as shown in FIG. 2. Regions 204, 206, and/or 208 may comprise regions of memory within source volume 202, such as, for example, data blocks. In some embodiments, source volume 202 may comprise a file system that organizes regions 204, 206, and 208 within source volume 202.

As mentioned above, source machine 201 may be used as a template to clone additional machines, such as target machines 201A, 201B, and 201C, as illustrated in FIG. 2. In at least one example, target machines 201A, 201B, and 201C may be substantially identical to source machine 201. Additionally, target machines 201A, 201B, and 201C may be substantially identical to one another. Target machines 201A, 201B, and 201C may be created based on source machine 201 using any suitable cloning technique. For example, a read-only image (golden image) of source machine 201 may be created. Target machines 201A, 201B, and 201C may then be created based on the read-only image of source machine 201.

Target machines 201A, 201B, and 201C may be located on one or more target-machine subsystems. For example, as shown in FIG. 2, target machines 201A, 201B, and 201C may be located on target-machine subsystem 210. In some embodiments, target machines 201A, 201B, and/or 201C may be located on separate subsystems. Additionally, target machines 201A, 201B, and 201C may each comprise at least one target volume that is substantially identical to at least one source volume on source machine 201. For example, target machine 201A may comprise a target volume 202A, target machine 201B may comprise a target volume 202B, and target machine 201C may comprise a target volume 202C. Each of target volumes 202A, 202B, and 202C may be substantially identical to source volume 202.

In various embodiments, target volumes 202A, 202B, and 202C may comprise regions of memory and/or storage devices that are substantially identical to regions of memory within source volume 202. For example, target volume 202A may comprise regions 204A, 206A, and 208A, target volume 202B may comprise regions 204B, 206B, and 208B, and target volume 202C may comprise regions 204C, 206C, and 208C, each of which may be substantially identical to regions 204, 206, and 208 on source machine 201, respectively.

In at least one embodiment, after target machines 201A, 201B, and 201C are initially created based on source machine 201, various changes may be made to target volumes 202A, 202B, and/or 202C. For example, over time, various patches, installations, upgrades, and/or other modifications may be applied or made to regions of memory in target volumes 202A, 202B, and/or 202C. Accordingly, over time, regions of memory in target volumes 202A, 202B, and/or 202C may change relative to source machine 201 and/or relative to one another. In at least one example, changes made to regions of memory in one of the target volumes may be identical to changes made to corresponding regions of memory in one or more of the remaining target volumes due to, for example, the application of identical patches, upgrades, or the like.

FIG. 3 is a block diagram of an exemplary system 300 for performing optimized backups of multiple volumes. As illustrated in this figure, exemplary system 300 may comprise a target-machine subsystem, such as target-machine subsystem 210 shown in FIG. 2. According to various embodiments, target-machine subsystem 210 may be in communication with a deduplication subsystem 310 and a backup server 320.

In one embodiment, and as will be described in greater detail below, target-machine subsystem 210, deduplication subsystem 310, and/or backup server 320 may be programmed to: 1) identify a plurality of volumes, such as target volumes 202A, 202B, and 202C, 2) prior to backing up the plurality of volumes, obtain information that indicates that at least one volume within the plurality of volumes comprises at least one shared region of memory that is identical to a region of memory on at least one other volume within the plurality of volumes, and 3) when creating backups of the plurality of volumes, backup each shared region of memory a single time so that the backups of the plurality of volumes share a single copy of each shared region of memory.

For example, and as will be described in greater detail below, deduplication subsystem 310 may create and/or store multiple deduplicated volumes 316A-316C, which may represent versions of target volumes 202A-202C that have been deduplicated to reduce storage space and/or processing requirements. In this example, deduplicated volumes 316A-316C may share common regions of memory and/or storage devices. Volumes 316A-316C may be deduplicated and maintained on deduplication subsystem 310 by a deduplication engine (such as deduplication engine 312). Deduplication engine 312 may also maintain deduplication information that identifies regions of memory (e.g., data blocks) in target volumes 202A, 202B, and 202C that are shared (i.e., identical).

In this example, before each region of memory in target volumes 202A, 202B, and 202C is read for backup, a query requesting deduplication information may be performed on target volumes 202A, 202B, and 202C. In one example, target volumes 202A, 202B, and 202C may consult deduplication engine 312 to obtain deduplication information that identifies the shared or common regions of memory in target volumes 202A, 202B, and 202C. This information may then be provided to backup server 320, which may use this information to determine, for each region of memory, whether an identical region of memory has been previously backed up for any of the target volumes. If an identical region of memory has been previously backed up, backup server 320 may update metadata information on backup server 320 to point to the identical region of memory. If, however, an identical region of memory has not been previously backed up, backup server 320 may back up the region of memory.

Target-machine subsystem 210, deduplication subsystem 310, and/or backup server 320 may comprise one or more computing devices representing any type or form of computing device capable of reading computer-executable instructions. Examples of such computing devices may include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Deduplication subsystem 310 generally represents any type or form of deduplication system. In one example, and as will be described in greater detail below, deduplication subsystem 310 may create and/or store multiple deduplicated volumes (or copies of the volumes). For example, deduplication subsystem 310 may create deduplicated volumes 316A-316C, which may represent deduplicated versions of target volumes 202A-202C that have been deduplicated to reduce storage space and/or processing requirements. In this example, deduplicated volumes 316A-316C may share common regions of memory and/or storage devices.

In another example, deduplicated volumes 316A, 316B, and 316C may represent snapshots (e.g., copy-on-write snapshots such as space-optimized snapshots) of one or more regions of memory in target volumes 202A, 202B, and/or 202C (e.g., regions 204A, 206A, and 208A). In this example, snapshots of a region within one of target volumes 202A, 202B, and 202C may be created and stored in one of deduplicated volumes 316A, 316B, and 316C when a change is made to the region. For example, a snapshot of region 204A in target volume 202A may be made just prior to modifying region 204A.

According to at least one embodiment, data stored in deduplicated volumes 316A, 316B, and 316C may be at least partially deduplicated to reduce storage requirements for deduplicated-data storage device 314. For example, in an example where deduplication subsystem 310 represents a deduplicated-snapshot subsystem, a snapshot of region 204B may be identical to a snapshot of region 204A stored in deduplicated volume 316A. In order to eliminate redundant storage of identical data, a physical copy of the snapshot of region 204B may not be stored on deduplicated-data storage device 314. Rather, deduplicated volume 316B may reference the identical snapshot region 204A stored in deduplicated volume 316A.

In various embodiments, deduplicated volumes 316A, 316B, and 316C may be maintained by deduplication engine 312. For example, deduplication engine 312 may control deduplication of data, such as snapshots, stored in deduplicated-data storage device 314. Additionally, deduplication engine 312 may also keep a record or index of deduplicated data stored in deduplicated-data storage device 314. In at least one example, information regarding deduplicated data stored in deduplicated-data storage device 314 may be accessed by deduplication-information module 114 in FIG. 1. For example, deduplication-information module 114 may transfer deduplication information between deduplication subsystem 310 and at least one of target-machine subsystem 210 and backup server 320.

Backup server 320 may include a backup-storage device 322, which in turn may comprise backup media for storing data, such as data related to target volumes 202A, 202B, and 202C. In certain examples, backup storage device 322 may be located external to backup server 320. In at least one example, backup-storage device 322 may include one or more backup volumes, such as backup volumes 324A, 324B, and 324C, which may in turn comprise backup copies of target volumes located on target-machine subsystem 210, such as target volumes 202A, 202B, and 202C.

According to various embodiments, exemplary system 300 may include at least one network. For example, target-machine subsystem 210 may communicate with deduplication subsystem 310 and/or backup server 320 over at least one network. Networks comprising a portion of exemplary system 300 may generally represent any medium or architecture capable of facilitating communication or data transfer. Examples of such networks include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Such a network may facilitate communication or data transfer using wireless or wired connections. In one embodiment, a network may facilitate communication between target-machine subsystem 210, deduplication subsystem 310, and/or backup server 320.

In certain embodiments, exemplary system 300 may comprise one or more portions of exemplary system 100 in FIG. 1. For example, one or more of modules 110 and/or databases 120 may be stored and configured to run on exemplary system 300 in FIG. 3.

Figure 4:
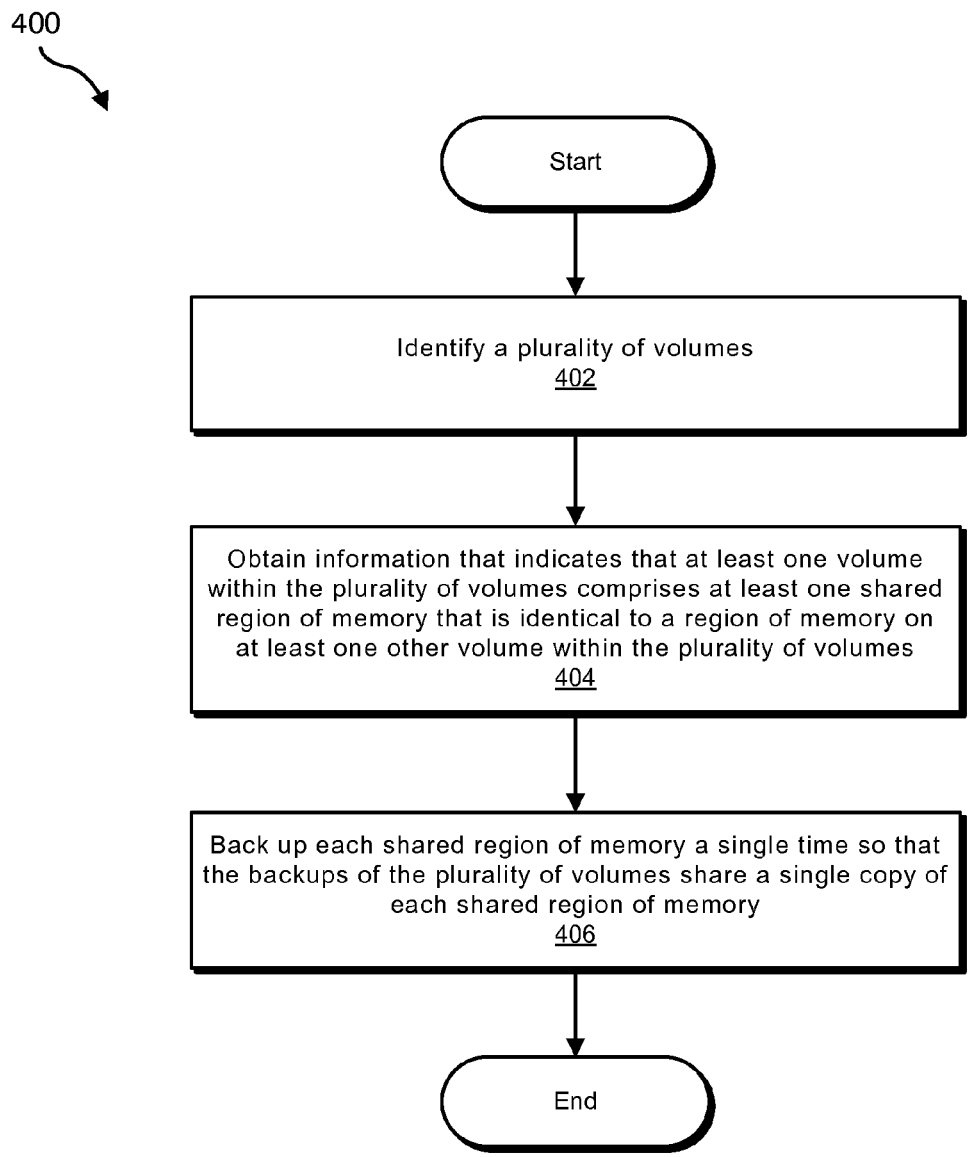
FIG. 4 is a flow diagram of an exemplary method for performing optimized backups of multiple volumes.

FIG. 4 is a flow diagram of an exemplary computer-implemented method 400 for performing optimized backups of multiple volumes. As illustrated in this figure, at step 402 the system may identify a plurality of volumes. For example, volume-management module 112 in FIG. 1 (which may, as detailed above, represent a module on target-machine subsystem 210, deduplication subsystem 310, and/or backup server 320 in FIG. 3) may identify a plurality of target volumes, such as target volumes 202A, 202B, and 202C located on target-machine subsystem 210 in FIG. 3.

Prior to backing up the plurality of volumes, at step 404 the system may obtain information that indicates that at least one volume within the plurality of volumes comprises at least one shared region of memory that is identical to a region of memory on at least one other volume within the plurality of volumes. For example, deduplication-information module 114 in FIG. 1 (which may, as detailed above, represent a module on target-machine subsystem 210, deduplication subsystem 310, and/or backup server 320 in FIG. 3) may obtain deduplication information concerning data stored in deduplicated-data storage device 314 on deduplication subsystem 310.

The system may perform step 404 in a variety of ways. In one embodiment, deduplication-information module 114 may obtain deduplication information from target-machine subsystem 210. For example, deduplication-information module 114 may query one of target volumes 202A, 202B, and 202C for information that identifies identical regions of memory in target volumes 202A, 202B, and/or 202C. In some examples, target volumes 202A, 202B, and/or 202C may, in response to this query, in turn request deduplication information that identifies these identical regions of memory from deduplication engine 312.

As detailed above, deduplication engine 312 may store and update information concerning deduplicated data located on deduplicated-data storage device 314. This deduplication information may indicate portions of deduplicated volumes 316A, 316B, and/or 316C that are identical and/or shared between the deduplicated volumes. For example, one or more regions of memory in target volumes 202A, 202B, and/or 202C may be shared between two or more deduplicated volumes 316A, 316B, and 316C. In this example, the deduplication information may likewise identify regions of memory (e.g., regions 204A, 204B, and 204C) in target volumes 202A, 202B, and/or 202C on target-machine subsystem 210 that are identical.

Upon receiving the deduplication information from deduplication engine 312, one of target volumes 202A, 202B, and 202C may supply the requested deduplication information to deduplication-information module 114 (which may, as detailed above, represent a module on backup server 320 in FIG. 3). In other examples, the deduplication information that identifies identical regions of memory in the target volumes may be stored on target machines 201A, 201B, and/or 201C (e.g., in target volumes 202A, 202B, and/or 202C).

Deduplication-information module 114 may also obtain deduplication information directly from deduplication engine 312 on deduplication subsystem 310. For example, deduplication-information module 114 may query deduplication engine 312 for deduplication information that identifies identical regions of memory in target volumes 202A, 202B, and/or 202C. In response, deduplication engine 312 may supply deduplication information that identifies regions of memory (e.g., regions 204A, 204B, and 204C) in target volumes 202A, 202B, and/or 202C on target-machine subsystem 210 that are identical.

As detailed above, deduplication-information module 114 may query target-machine subsystem 210 and/or deduplication subsystem 310 for deduplication information that identifies identical regions of memory in target volumes 202A, 202B, and/or 202C. In other examples, target-machine subsystem 210 and/or deduplication subsystem 310 may automatically (i.e., sua sponte) send deduplication information that identifies identical regions of memory in target volumes to deduplication-information module 114. For example, target-machine subsystem 210 (e.g., one or more of target volumes 202A, 202B, and/or 202C) and/or deduplication subsystem 310 (e.g., deduplication engine 312) may periodically and automatically send deduplication information that identifies identical regions of memory in target volumes 202A, 202B, and/or 202C to deduplication-information module 114 (which may, as detailed above, represent a module on backup server 320 in FIG. 3).

Returning to FIG. 4, when creating backups of the plurality of volumes, at step 406 the system may back up each shared region of memory a single time so that the backups of the plurality of volumes share a single copy of each shared region of memory. For example, backup module 116 in FIG. 1 (which may, as detailed above, represent a module on target-machine subsystem 210, deduplication subsystem 310, and/or backup server 320 in FIG. 3) may, prior to backing up target volumes 202A, 202B, and 202C, use the information obtained by deduplication-information module 114 in step 404 to identify regions of memory in target volumes 202A, 202B, and/or 202C that are identical.

Backup module 116 may then transfer only a single copy of the identical regions of memory to be backed up to backup server 320. For example, if regions 204A and 204B on target-machine subsystem 210 are identical, backup module 116 may send only a single copy of region 204A to backup server 320, while refraining from sending a copy of region 204B to backup server 320. Backup server 320 may then back up only the single shared copy of the identical regions of memory so that two or more backup volumes share the single region of memory, as will be described in greater detail below.

According to at least one embodiment, backups of volumes in target-machine subsystem 210 may be stored in backup-storage device 322 on backup server 320. For example, backups of target volumes 202A, 202B, and 202C may be stored on backup-storage device 322 as backup volumes 324A, 324B, and 324C. Backup volumes 324A, 324B, and 324C may comprise copies of regions of memory corresponding to regions of memory in target volumes 202A, 202B, and 202C.

Figure 5:
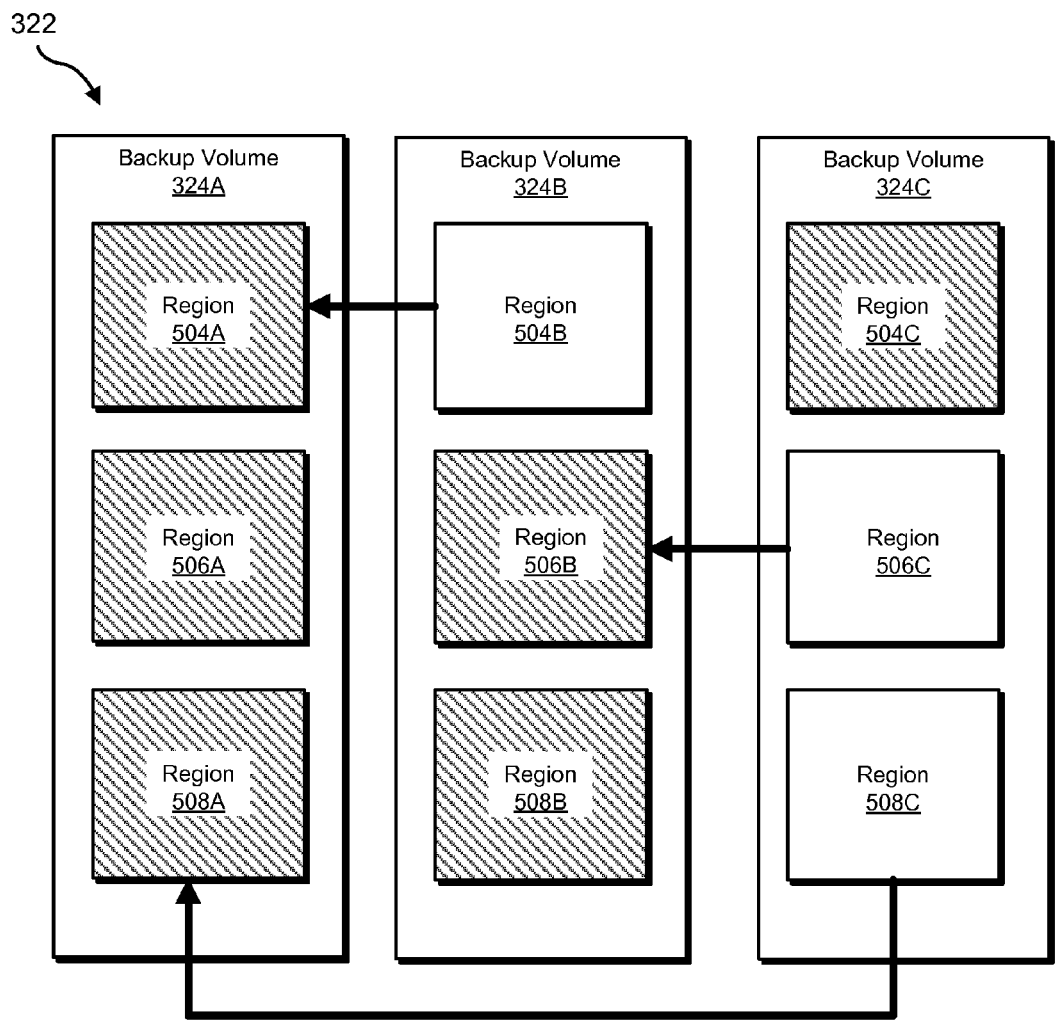
FIG. 5 is a block diagram of an exemplary backup database comprising multiple backup volumes sharing various regions of memory.

In some examples, as illustrated in FIG. 5, backup volumes 324A, 324B, and 324C may comprise regions of memory (i.e., regions 504A, 504B, 504C, 506A, 506B, 506C, 508A, 508B, and 508C) corresponding to regions of memory in target volumes 202A, 202B, and 202C. As will be explained in greater detail below, only single instances of identical regions of memory may be stored in backup volumes 324A, 324B, and 324C.

In some examples, at least a portion of backup module 116 may be located on target-machine subsystem 210, deduplication subsystem 310, and/or another location external to backup server 320. In such examples, backup module 116 may first determine which regions of memory in target volumes on target-machine subsystem 210 are identical before sending data associated with those regions of memory to backup server 320. For example, backup module 116 may receive information from deduplication-information module 114 indicating that two or more regions of memory in target volumes 202A, 202B, and 202C on target-machine subsystem 210 are identical. Backup module 116 may then send only a single copy of one of the identical regions of memory from target-machine subsystem 210 to backup server 320.

Accordingly, backup server 320 may not receive copies or hashes of all of the regions of memory stored in the target volumes for purposes of performing a comparison between the regions of memory on the backup server 320. Rather, a comparison between the regions of memory may first be performed external to backup server 320, such as on target-machine subsystem 210 and/or deduplication subsystem 310, as described above. Subsequently, backup server 320 may receive only one copy of each of the duplicate regions from target-machine subsystem 210.

In at least one example, backup module 116 may initially back up a first target volume (e.g., target volume 202A in FIGS. 2 and 3) to backup volume 324A. In some embodiments, backup module 116 may determine that copies of regions of memory (e.g., regions 204A, 206A, and 208A) corresponding to regions 504A, 506A, and 508A have not been stored in backup-storage device 322. Accordingly, backup module 116 may store copies of regions of memory (e.g., regions 204A, 206A, and 208A) in regions 504A, 506A, and 508A in backup-storage device 322. In some embodiments, the regions of memory to be backed up to regions 504A, 506A, and 508A in backup-storage device 322 may be sent from target-machine subsystem 210 to backup-storage device 322.

Backup module 116 may then back up a second target volume (e.g., target volume 202B in FIGS. 2 and 3) to backup volume 324B. Backup module 116 may receive information (such as deduplication information received by deduplication-information module 114) indicating that a region of memory to be backed up as region 504B is identical to the region of memory previously backed up as region 504A. Accordingly, instead of storing a copy of a region of memory (e.g., region 204B) in region 504B on backup-storage device 322, backup volume 324B may reference region 504A. Accordingly, only a single instance of the data stored in region 504A may be stored on backup-storage device 322.

Backup volumes may reference another region of memory in any suitable manner, such as, for example, by using metadata pointing to the shared region. For example, backup volume 324B may reference region 504A of backup volume 324A by creating and storing metadata that points to region 504A. In some embodiments, backup module 116 may determine that there are no copies of regions of memory (e.g., regions 206B and 208B) corresponding to regions 506B and 508B that are stored on backup-storage device 322. Accordingly, backup module 116 may back up and store copies of regions of memory (e.g., regions 206B and 208B) in regions 506B and 508B on backup-storage device 322.

As further shown in FIG. 5, backup module 116 may then back up a third target volume (e.g., target volume 202C in FIGS. 2 and 3) to backup volume 324C. Backup module 116 may receive information (such as deduplication information received by deduplication-information module 114) indicating that a region of memory to be backed up as region 506C is identical to the region of memory previously backed up as region 506B. Backup module 116 may additionally receive information indicating that a region of memory to be backed up as region 508C is identical to the region of memory previously backed up as region 508A. Accordingly, instead of storing copies of regions of memory (e.g., region 206C and 208C) in regions 506C and 508C in backup-storage device 322, backup volume 324C may reference regions 506B and 508A. Accordingly, only a single instance of the data stored in regions 506B and 508A may be stored on backup-storage device 322.

In some embodiments, a region of memory that is stored on backup server 320 and shared by two or more backup volumes may comprise at least one data block. Accordingly, exemplary method 400 may be used in conjunction with block-level-incremental backup technologies, enabling use of block-based deduplication information having region-size granularity.

By obtaining information that identifies shared regions of memory within multiple volumes that are identical, the systems disclosed herein may, during a subsequent backup operation, use this information to only transfer a single copy of each shared region of memory to a backup server. Because the systems may not need to transfer multiple copies of identical regions of memory to a backup server, this may reduce the amount of bandwidth required to perform a backup operation in comparison with conventional backup systems. In addition, because the bandwidth and resources required to accomplish a backup operation may be reduced, the backup window required to accomplish the backup operation may also be reduced.

Additionally, because previously generated deduplication information may be used to back up data to a backup server, the systems disclosed herein may eliminate any need to replicate deduplication data in order to optimize backup data storage. Moreover, because a single copy of a region of memory may be shared among multiple backups on a backup server, the amount of storage space required on the backup server may be reduced in comparison with conventional backup systems.

Figure 6:
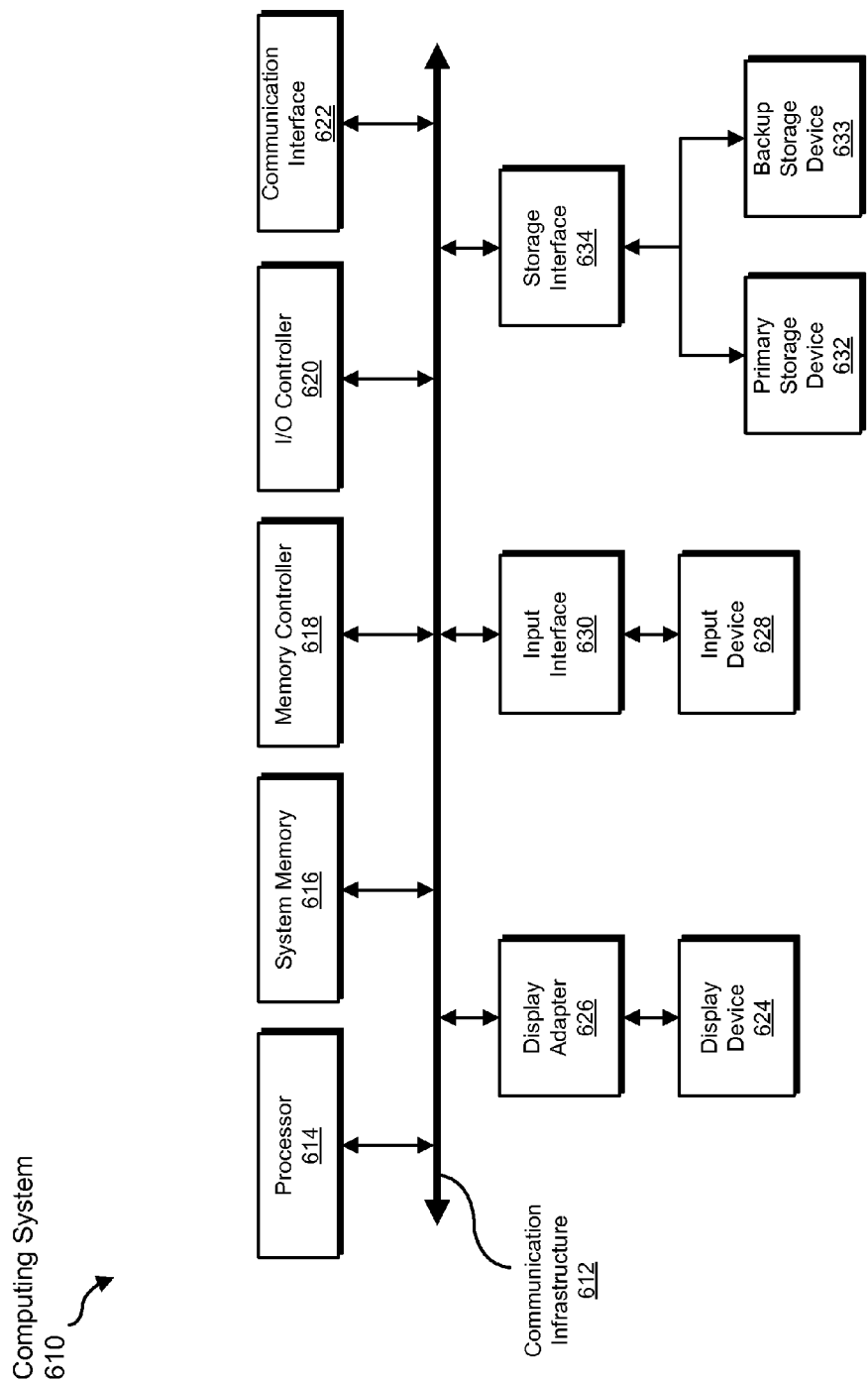
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the indentifying, backing up, obtaining, creating, referencing, and providing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as indentifying, backing up, obtaining, creating, referencing, and providing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the indentifying, backing up, obtaining, creating, referencing, and providing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the indentifying, backing up, obtaining, creating, referencing, and providing steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the indentifying, backing up, obtaining, creating, referencing, and providing steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup-storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the indentifying, backing up, obtaining, creating, referencing, and providing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
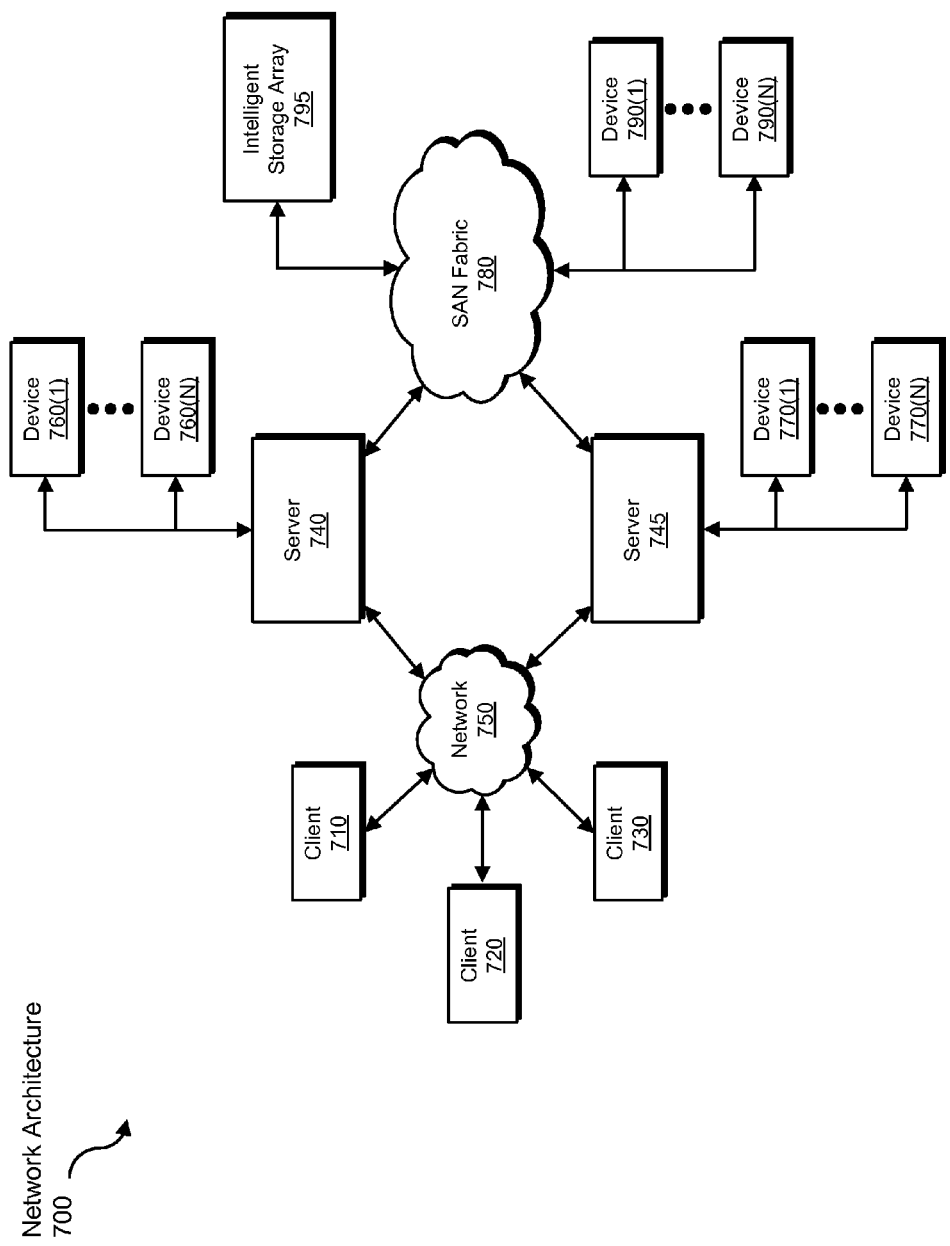
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, backing up, obtaining, creating, referencing, and providing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for performing optimized backups of multiple volumes. In one example, this exemplary method may comprise: 1) identifying a plurality of volumes, 2) prior to backing up the plurality of volumes, obtaining information that indicates that at least one volume within the plurality of volumes comprises at least one shared region of memory that is identical to a region of memory on at least one other volume within the plurality of volumes, and 3) when creating backups of the plurality of volumes, backing up each shared region of memory a single time so that the backups of the plurality of volumes share a single copy of each shared region of memory.

Obtaining the information may comprise receiving the information from a deduplication subsystem associated with the plurality of volumes and/or at least one volume within the plurality of volumes. According to some embodiments, the method may comprise, prior to receiving the information, transmitting a query requesting the information to the deduplication subsystem and/or at least one volume within the plurality of volumes.

The deduplication subsystem may comprise a deduplication engine that deduplicates data blocks received from the plurality of volumes. In at least one embodiment, the deduplication subsystem may comprise a deduplicated-snapshot subsystem programmed to create deduplicated snapshots of the plurality of volumes. In this example, the deduplicated snapshots may comprise copy-on-write snapshots.

According to various embodiments, backing up each shared region of memory a single time may comprise, for each shared region of memory, backing up a first volume that contains the shared region of memory to create a backup of the first volume. In some embodiments, creating backups of the plurality of volumes may comprise backing up additional volumes that contain the shared region of memory by: 1) only backing up regions of memory in the additional volumes that do not correspond to the shared regions of memory and 2) referencing, in backups for the additional volumes, the shared region of memory in the backup of the first volume.

In at least one embodiment, referencing, in the backups for the additional volumes, the shared region of memory in the backup of the first volume may comprise storing, in the backups for the additional volumes, metadata that points to the shared region of memory in the backup of the first volume. In various examples, the shared region of memory may comprise at least one data block. Additionally, the plurality of volumes may comprise virtual-machine volumes and/or physical-machine volumes. In some examples, the plurality of volumes may be substantially identical to each other.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing optimized backups of multiple independent volumes, at least a portion of the method being performed by a computing system comprising at least one processor, the method comprising:

identifying a plurality of independent volumes to be backed up to a backup server over a network, wherein:
        each volume within the plurality of independent volumes corresponds to a different machine;
        a deduplication subsystem that is external to the backup server creates and stores deduplicated versions of the plurality of independent volumes by identifying and storing shared regions of memory among the plurality of independent volumes a single time;

prior to transferring any data within, or any hashes of, the plurality of independent volumes to the backup server, obtaining information from the deduplication subsystem that indicates that at least one volume within the plurality of independent volumes comprises at least one shared region of memory that is identical to a region of memory on at least one other volume within the plurality of independent volumes;

when creating backups of the plurality of independent volumes, using the obtained information to:
  transfer only a single copy of each shared region of memory to the backup server;
  back up each shared region of memory a single time so that the backups of the plurality of independent volumes share a single copy of each shared region of memory.

2. The computer-implemented method of claim 1, wherein obtaining the information from the deduplication subsystem comprises:
  obtaining the information directly from the deduplication subsystem;
  obtaining the information from the deduplication subsystem via at least one volume within the plurality of independent volumes.

3. The computer-implemented method of claim 2, further comprising, prior to obtaining the information, transmitting a query requesting the information to at least one of:
  the deduplication subsystem;
  at least one volume within the plurality of independent volumes.

4. The computer-implemented method of claim 1, wherein the deduplication subsystem comprises a deduplicated-snapshot subsystem programmed to create deduplicated snapshots of the plurality of independent volumes.

5. The computer-implemented method of claim 4, wherein the deduplicated snapshots comprise copy-on-write snapshots.

6. The computer-implemented method of claim 1, wherein the deduplication subsystem further comprises a deduplication engine that deduplicates data blocks received from the plurality of independent volumes.

7. The computer-implemented method of claim 1, wherein backing up each shared region of memory a single time comprises, for each shared region of memory, backing up a first volume that contains the shared region of memory to create a backup of the first volume.

8. The computer-implemented method of claim 7, wherein creating backups of the plurality of independent volumes comprises backing up additional volumes that contain the shared region of memory by:
  only backing up regions of memory in the additional volumes that do not correspond to the shared region of memory;
  referencing, in backups for the additional volumes, the shared region of memory in the backup of the first volume.

9. The computer-implemented of claim 8, wherein referencing, in the backups for the additional volumes, the shared region of memory in the backup of the first volume comprises storing, in the backups for the additional volumes, metadata that points to the shared region of memory in the backup of the first volume.

10. The computer-implemented method of claim 1, wherein the shared region of memory comprises at least one data block.

11. The computer-implemented method of claim 1, wherein the plurality of independent volumes comprise at least one of:
  virtual-machine volumes;
  physical-machine volumes.

12. The computer-implemented method of claim 1, wherein the plurality of independent volumes are substantially identical to each other.

13. A system for performing optimized backups of multiple independent volumes, the system comprising: a volume-management module programmed to identify a plurality of independent volumes to be backed up to a backup server over a network, wherein: each volume within the plurality of independent volumes corresponds to a different machine; a deduplication subsystem that is external to the backup server creates and stores deduplicated versions of the plurality of independent volumes by identifying and storing shared regions of memory among the plurality of independent volumes a single time; a deduplication-information module programmed to obtain, prior to transferring any data within, or any hashes of, the plurality of independent volumes to the backup server, information from the deduplication subsystem that indicates that at least one volume within the plurality of independent volumes comprises at least one shared region of memory that is identical to a region of memory on at least one other volume within the plurality of independent volumes; a backup module programmed to use the obtained information when creating backups of the plurality of independent volumes to: transfer only a single copy of each shared region of memory to the backup server; back up each shared region of memory a single time so that the backups of the plurality of independent volumes share a single copy of each shared region of memory; at least one hardware processor configured to execute at least one of the volume-management module, the deduplication-information module, and the backup module.

14. The system of claim 13, wherein the deduplication-information module obtains the information from the deduplication subsystem by:
  obtaining the information directly from the deduplication subsystem;
  obtaining the information from the deduplication subsystem via at least one volume within the plurality of independent volumes.

15. The system of claim 14, wherein the deduplication-information module is further programmed to transmit, prior to obtaining the information, a query requesting the information to at least one of:
  the deduplication subsystem;
  at least one volume within the plurality of independent volumes.

16. The system of claim 13, wherein the backup module backs up each shared region of memory a single time by, for each shared region of memory, backing up a first volume that contains the shared region of memory to create a backup of the first volume.

17. The system of claim 16, wherein the backup module creates backups of the plurality of independent volumes by backing up additional volumes that contain the shared region of memory by:
  only backing up regions of memory in the additional volumes that do not correspond to the shared region of memory;

referencing, in backups for the additional volumes, the shared region of memory in the backup of the first volume.

18. The system of claim 17, wherein the backup module references, in the backups for the additional volumes, the shared region of memory in the backup of the first volume by storing, in the backups for the additional volumes, metadata that points to the shared region of memory in the backup of the first volume.

19. A non-transitory computer-readable-storage medium comprising one or more computer executable instructions that, when executed by a computing device comprising at least one processor, cause the computing device to:
  identify a plurality of independent volumes to be backed up to a backup server over a network, wherein:
    each volume within the plurality of independent volumes corresponds to a different machine;
    a deduplication subsystem that is external to the backup server creates and stores deduplicated versions of the plurality of independent volumes by identifying and storing shared regions of memory among the plurality of independent volumes a single time;
  prior to transferring any data within, or any hashes of, the plurality of independent volumes to the backup server, obtain information from the deduplication subsystem that indicates that at least one volume within the plurality of independent volumes comprises at least one shared region of memory that is identical to a region of memory on at least one other volume within the plurality of independent volumes;
  when creating backups of the plurality of independent volumes, using the obtained information to:
    transfer only a single copy of each shared region of memory to the backup server;
    back up each shared region of memory a single time so that the backups of the plurality of independent volumes share a single copy of each shared region of memory.

20. The non-transitory computer-readable-storage medium of claim 19, wherein the one or more computer executable instructions cause the computing device to obtain the information from the deduplication subsystem by: obtaining the information directly from the deduplication subsystem; obtaining the information from the deduplication subsystem via at least one volume within the plurality of independent volumes.

* * * * *

UNITED STATES PATENT AND TRADEMARK OFFICE
CERTIFICATE OF CORRECTION

PATENT NO. : 8,612,702 B1  
APPLICATION NO. : 12/414782  
DATED : December 17, 2013  
INVENTOR(S) : Sasidharan Krishnan and Suhas Urkude Page 1 of 1

It is certified that error appears in the above-identified patent and that said Letters Patent is hereby corrected as shown below:

In the Claims

Claim 9, at column 7, lines 60 to 61, should read:

The computer-implemented method of claim 8, wherein referencing, in the backups for the additional volumes, the shared Signed and Sealed this
Thirteenth Day of May, 2014

Michelle K. Lee
*Deputy Director of the United States Patent and Trademark Office*